(12) United States Patent
Resh

(10) Patent No.: US 6,368,502 B1
(45) Date of Patent: Apr. 9, 2002

(54) SWIMMING POOL CLEANING TOOL

(76) Inventor: Eric Resh, 44641 Alighchi Way, Temecula, CA (US) 92592

( * ) Notice: Subject to any disclaimer, the term of this patent is extended or adjusted under 35 U.S.C. 154(b) by 0 days.

(21) Appl. No.: 08/570,234

(22) Filed: Dec. 11, 1995

Related U.S. Application Data

(63) Continuation of application No. 08/296,226, filed on Aug. 25, 1994, now Pat. No. 5,473,786.

(51) Int. Cl.[7] .............................. B01D 35/00; E04H 4/16
(52) U.S. Cl. ...................... 210/238; 210/470; 210/495; 210/1.7
(58) Field of Search ................................ 210/238, 470, 210/471, 495; 15/1.7; 43/11

(56) References Cited

U.S. PATENT DOCUMENTS

| | | | | |
|---|---|---|---|---|
| 2,205,706 A | * | 6/1940 | Wolff ............................. | 43/11 |
| 2,420,087 A | | 5/1947 | Meek ............................. | 43/11 |
| 2,464,921 A | | 3/1949 | Chandler ....................... | 210/471 |
| 2,486,163 A | | 10/1949 | Jennings et al. ............... | 43/11 |
| 2,853,195 A | | 9/1958 | Malcolm ....................... | 210/471 |
| 2,867,331 A | | 1/1959 | Bader ............................ | 210/471 |
| 2,939,238 A | * | 6/1960 | Ertel et al. ..................... | 43/11 |
| 3,188,668 A | | 6/1965 | Buckelew ...................... | 15/1.7 |
| 3,220,037 A | * | 11/1965 | Ruhling ......................... | 210/471 |
| 3,688,483 A | * | 9/1972 | Hamilton ....................... | 15/1.7 |
| 3,863,237 A | * | 1/1975 | Doer .............................. | 15/1.7 |
| 3,962,758 A | | 6/1976 | Knappe et al. ................ | 24/255 |
| 3,979,146 A | | 9/1976 | Berg ............................. | 15/1.7 |
| 4,003,100 A | | 1/1977 | Whitaker ....................... | 15/1.7 |
| 4,034,710 A | | 7/1977 | Carter ........................... | 43/11 |
| 4,169,331 A | | 10/1979 | Baker ............................ | 15/1.7 |
| 4,176,419 A | | 12/1979 | MacDonald ................... | 15/1.7 |
| 4,198,720 A | | 4/1980 | Matsumoto .................... | 15/1.7 |
| 4,225,437 A | | 9/1980 | Woodward ..................... | 15/1.7 |
| 4,452,801 A | | 6/1984 | Lieber ............................ | 15/1.7 |
| 4,481,117 A | | 11/1984 | Collins .......................... | 15/1.7 |
| 4,846,972 A | | 7/1989 | Anderson ...................... | 15/1.7 |
| 4,880,531 A | | 11/1989 | Blake et al. ................... | 15/1.7 |
| D311,796 S | | 10/1990 | Collins | |
| 4,994,178 A | | 2/1991 | Brooks .......................... | 15/1.7 |
| 5,137,623 A | | 8/1992 | Wall et al. ..................... | 15/1.7 |
| 5,473,786 A | * | 12/1995 | Resh ............................. | 210/470 |

FOREIGN PATENT DOCUMENTS

| | | | | |
|---|---|---|---|---|
| CA | 477632 | * | 10/1951 | ................. 210/471 |

OTHER PUBLICATIONS

Facsimile of a Photocopy of a Cross–Section of "Pools Pals Rake With Wide Pocket", purchased approximately Aug. 1995.
Blue Devil, "Setting a Standard for Quality", 4 pages.
Purity Pool, "New Specialty Rakes from Purity Pool", 2 pages.
Purity Pool, "What's It All About?", 2 pages.
T & K Pool Products MFG, "Installation Instructions", 1 page.
Aquatic Products Company, "Aquapro".

* cited by examiner

Primary Examiner—Matthew O. Savage
(74) Attorney, Agent, or Firm—J. Mark Holland

(57) ABSTRACT

A tool for cleaning debris from swimming pools includes a frame, a corresponding net, and retaining means for retaining the net on the frame. The preferred retaining means is an elongated strip of resilient, flexible material, having a generally U-shaped cross-section. The web portion of the cross-section includes an exterior surface smoothly shaped between its two edges to urge debris from the pool into the net. The leg portions of the cross-section include gripping portions to assist in engaging and/or disengaging the retaining means from the frame, to permit the net to be assembled, changed or replaced. The preferred frame of the tool is fabricated from metal and includes an elongated, curved frame portion with its ends welded to a tubular attachment member, to permit attachment of the tool to a handle, pole or similar structure. A corresponding preferred method of use is also disclosed.

38 Claims, 6 Drawing Sheets

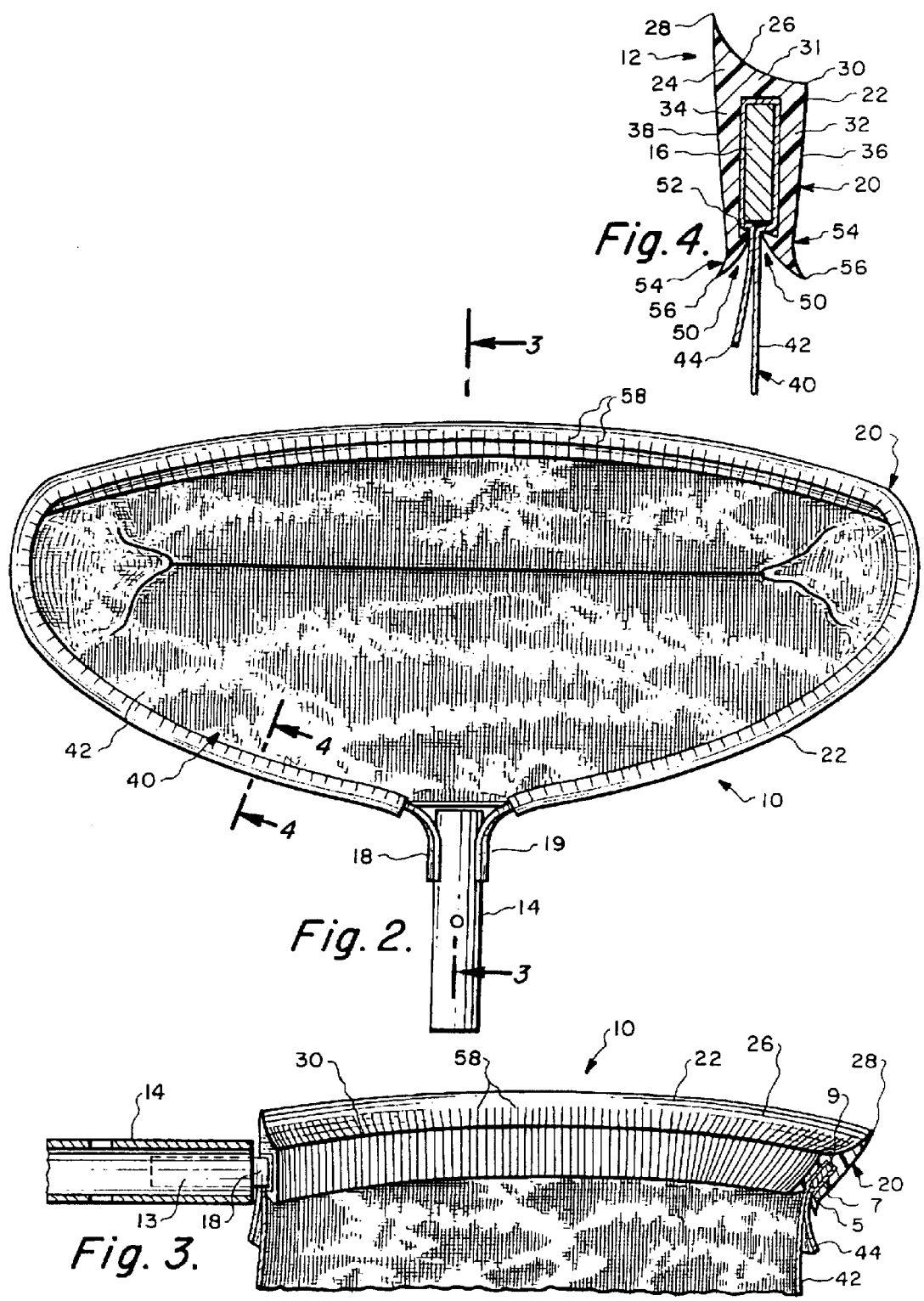

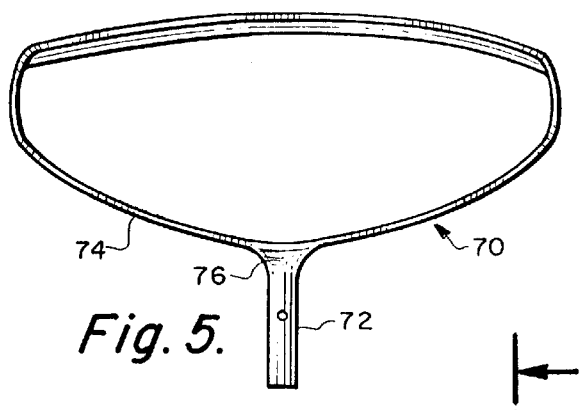
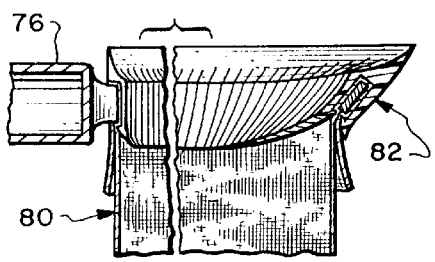
Fig. 5.
Fig. 7.
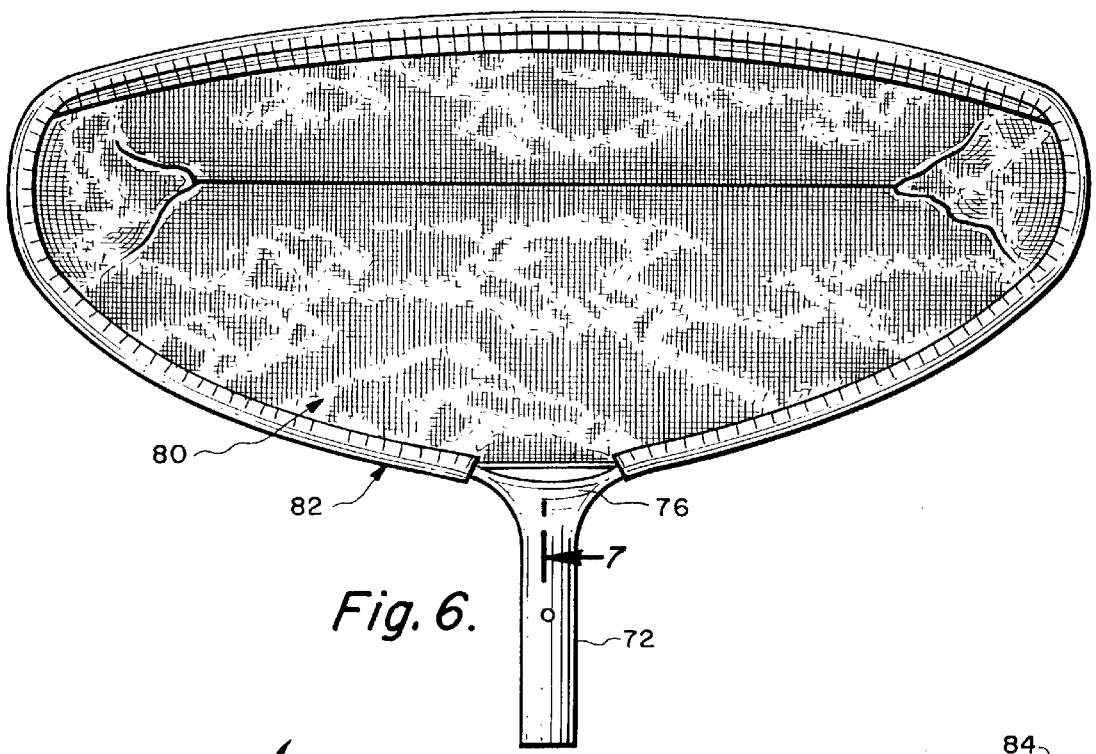
Fig. 6.
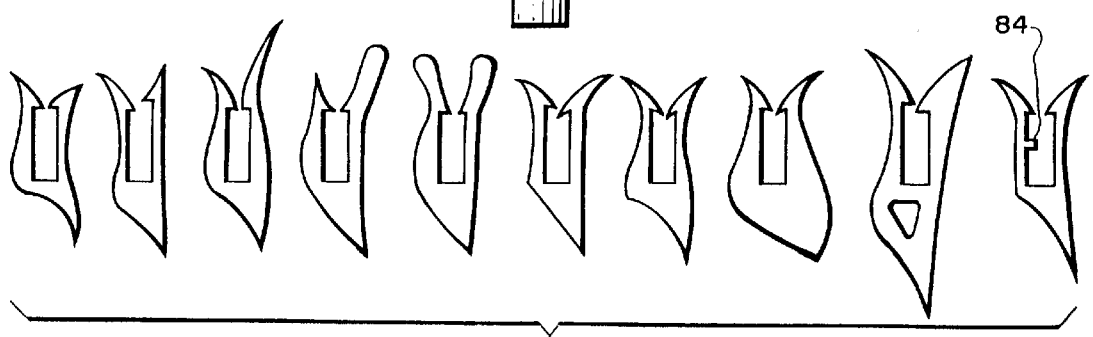
Fig. 8.

SWIMMING POOL CLEANING TOOL

This application is a continuation of application Ser. No. 08/296,226, filed Aug. 25, 1994, issued Dec. 12, 1995 as U.S. Pat. No. 5,473,786.

BACKGROUND OF THE INVENTION

This invention relates to swimming pool cleaning devices generally, and more specifically to an improved tool to remove debris from a swimming pool utilizing a frame with a net retained thereon by a retaining member.

Prior art devices, sometimes called "pool rakes", have utilized a modular approach to attempt to permit replacement of parts of the rake that may tend to wear out. Among such prior art modular devices is the Aquapro #BR18. Such devices typically include a replaceable net sized and configured to fit a frame, a replaceable elongated clip to hold the net to the frame, and attachment means to attach the frame to a handle or pole.

These prior art attempts to permit assembly and/or replacement of parts have been less than satisfactory. Among other things, the prior art devices of which this inventor is aware do not permit ready assembly or removal of the elongated clip from the frame. In certain circumstances, a screwdriver or other implement is required to accomplish the removal, by prying the clip from the frame. Sometimes this removal is so awkward or difficult that the net, the frame, and/or the clip itself can be further damaged or destroyed during the operation, or the user's hands can be injured.

In addition, although some prior art clips are assertedly shaped to assist in scooping up debris, their actual shape does not provide a smooth, uninterrupted ramping surface to urge the debris into the net.

Additionally, many prior art tools of this type are not adequately designed to withstand the forces that can be generated from normal use, and therefore break at the neck of the attachment to the handle or pole. This can result in catastrophic failure of the tool requiring replacement of the frame member, damage to the net, and related problems and costs.

OBJECTS AND ADVANTAGES OF THE INVENTION

It is, therefore, an object of my invention to provide an improved tool for cleaning debris from swimming pools, including the combination of frame means forming a mouth portion and net means covering the mouth portion, with retaining means for retaining the net means in operative relationship with the frame means. In the preferred embodiment, the retaining means has a first portion that extends from the frame means when the retaining means is operably assembled with the frame and net. That first portion of the retaining means includes a front surface with a first edge configured to contact a surface of the pool and a second edge positioned rearwardly with respect to the first edge as the tool is normally moved through the pool water. The second edge is positioned inwardly from the first edge with respect to the mouth of the frame, and the front surface constitutes a smooth transition between the first and second edges. Thus, the front surface and the first and second edges are configured to scoop debris from the pool surface and direct it away from the first edge and toward the second edge, and thereafter into the net means.

Another object of my invention is the provision of a tool of the aforementioned character, in which the retaining means is fabricated from a flexible, resilient material, in a generally U-shaped cross-section. Among other things, the shape memory of the material permits the leg portions (or one of them) to be temporarily and readily deformed to release the clip or retaining means from the frame and thereby permit the net to be replaced, initially assembled, and/or reassembled.

To assist in this operation, preferably at least the one aforementioned leg portion further includes gripping means to permit a user to readily grip and manipulate the leg portion and a corresponding detent means to and from the normally engaged relationship with respect to the frame means, to accomplish the aforesaid engagement and disengagement. The gripping means preferably includes a grippable portion extending outwardly from the frame means beyond a plane defined by the outer surface of the at least one leg portion.

Yet another object of my invention is the provision of a tool of the aforementioned character in which the frame means is fabricated from metal or plastic and includes an elongated, curved frame portion, and the frame portion has first and second ends welded or bonded to a tubular attachment means, with the welding or bonding occurring over a sufficient area to provide improved strength in comparison to prior art devices. The attachment means is preferably configured conventionally, to permit attachment of the tool to handle or pole means.

Still another object of my invention is the provision of an improved retaining device for retaining a net on a frame whereby the assembled net, frame and retaining device may be utilized to clean debris from swimming pools. The preferred retaining device includes an elongated body with a substantially U-shaped cross-section, the cross-section including a central web and leg portions extending therefrom. The interior surfaces of the web and the leg portions are configured to grippingly engage and retain the net on the frame when the device is operatively assembled therewith. The web means has an exterior surface defined by a first edge and a second edge, and the first and second edges and the exterior surfaces are preferably configured to form a smoothly sloping surface. This smooth, uninterrupted slope permits the assembled net, frame and retaining device to be moved through the swimming pool and to urge any debris away from the first edge and toward the second edge, and thereafter into the net.

An additional object of my invention is the provision of an improved retaining device of the aforementioned character, in which the leg portions are fabricated from a flexible, resilient material and include detent means for engaging the frame when the leg portions are in their normal unflexed configuration, the leg portions further include gripping means to permit a user to grip and manipulate the leg portion (or portions) and its corresponding detent means to and from its normal position to permit engagement and/or disengagement of the retaining means with or from the frame.

Other objects and advantages of the invention will be apparent from the following specification and the accompanying drawings, which are for the purpose of illustration only.

BRIEF DESCRIPTION OF THE DRAWINGS

FIG. 2 is a plan view similar to FIG. 1, but showing a preferred assembly of net means and retaining means with the frame means;

FIG. 3 is a sectional view taken along line 3—3 of FIG. 2;

FIG. 4 is a sectional view taken along line 4—4 of FIG. 2, illustrating among other things a preferred embodiment of the retaining means of the invention;

FIG. 5 is similar to FIG. 1, but illustrates another of the many alternative embodiments of the frame means of the invention;

FIG. 6 is similar to FIG. 2, but illustrates the assembly of net means and retaining means with the frame means of FIG. 5;

FIG. 7 is a broken sectional view taken along line 7—7 of FIG. 6, but illustrating shorter serrations or slots on one leg portion of the retaining means;

FIG. 8 illustrates some of the many alternative embodiments of cross-sections of the retaining means of the invention;

DESCRIPTION OF PREFERRED EMBODIMENT

Figure 1:
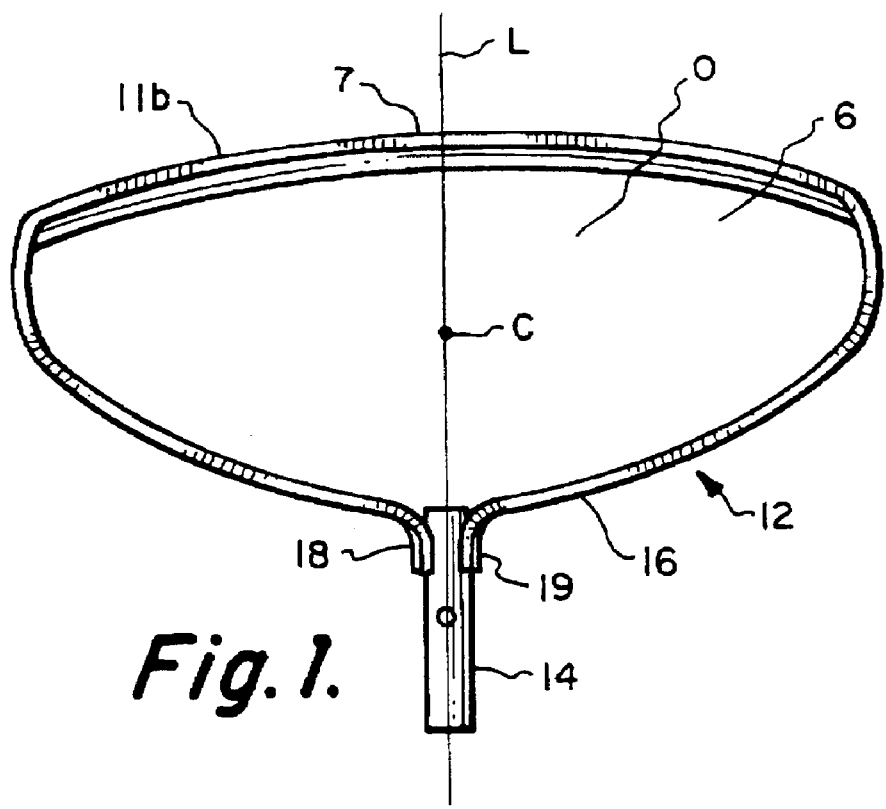
FIG. 1 is a plan view of a preferred embodiment of frame means constructed in accordance with the teachings of the invention.

Referring now to the drawings, and particularly to FIGS. 1–4 thereof, I show a preferred embodiment of a swimming pool cleaning tool 10 including a preferred retaining means 20.

Figure 1C:
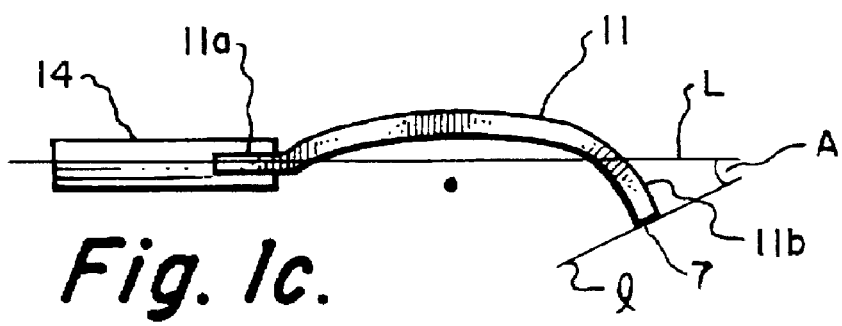
FIG. 1c is a side elevation view taken along line 1c–1c of FIG. 1b.
Figure 1A:
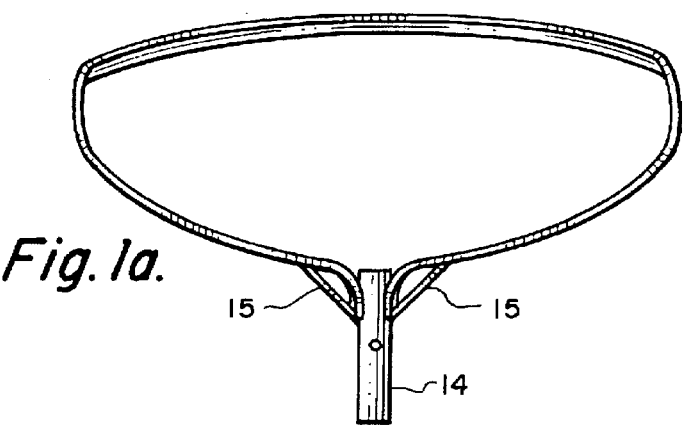
FIGS. 1a and 1b are plan views similar to FIG. 1, illustrating some of the alternative embodiments of the frame means of FIG. 1.
Figure 1B:
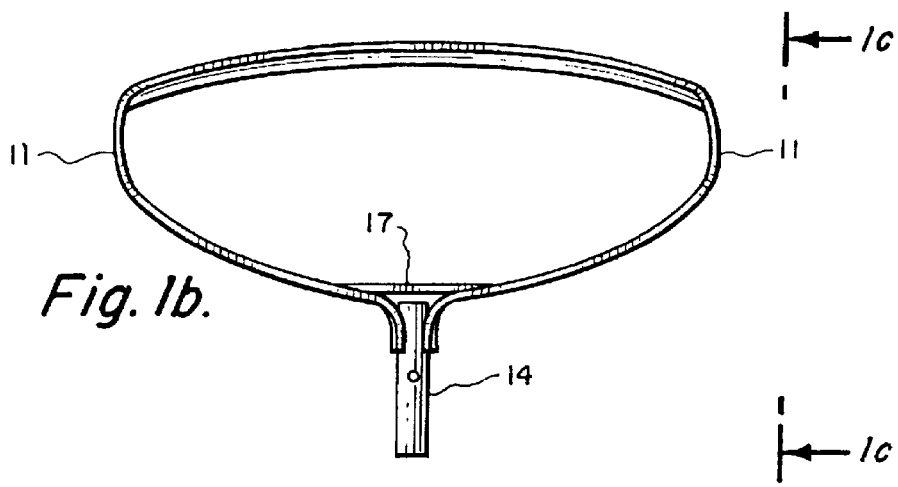

The tool 10 includes preferred frame means 12 forming a mouth portion 6, FIG. 1, preferably having conventional attachment means 14 and an elongated frame member 16 with its ends 18 and 19 welded to the attachment means 14. In the preferred embodiment, the frame means is fabricated from stainless steel or aluminum or other suitably strong, lightweight, cost-effective material. FIGS. 1a and 1b illustrate some of the many alternative embodiments of frame means 12, including the use of bracing members 15 and 17, also preferably of metal and welded to improve the strength and durability of the frame means 12.

Persons of ordinary skill in the art will understand that, although the attachment means 14 itself is conventional (in that it is preferably tubular with a conventional internal spring-action engagement member to engage a pole or handle, not shown), the preferred affixation of the ends 18 and 19 to the attachment means 14 is not conventional.

Among other things, and as indicated above, that affixation makes the tool 10 more durable than prior art devices. During use of this type of tool, various stresses can be concentrated in the neck portion (such as where the ends 18 and 19 join the attachment means 14). As indicated above, prior art devices are not sufficiently durable at this stress area, and repeated use of such prior art devices can fatigue the joint and/or materials thereabout, resulting in catastrophic failure and consequent damages and costs.

The preferred embodiment of the invention, in contrast, includes an expanded (in contrast with prior art devices) area of contact 13, FIG. 3, between the attachment means 14 and the two ends 18 and 19 of elongated frame member 16. Preferably, most if not all of this expanded area of contact 13 is used to weld, bond, glue or otherwise affix the ends 18 and 19 to the attachment means 14, thereby spreading the stress forces over a greater area and reducing the concentration and consequent risk of damage from those forces. It appears that, for non-welded embodiments, the ends 18 and 19 should preferably be in confronting relationship along a sufficient length of the attachment means 14 to provide a strong, durable affixation, with the ends being bonded or otherwise affixed thereto along substantially all of the length of the confronting relationship.

The preferred choice of welding the ends 18 and 19 to the attachment means 14 also enhances the durability of the tool 10 as compared to non-welded prior art devices, regardless of the relative size of the contact area 13.

Among the many alternative embodiments of frame means 12 are embodiments such as FIGS. 1a and 1b, which include the use of bracing members 15 and 17 to additionally or alternatively reduce the stress concentration in the neck area.

The usability and effectiveness of the tool 10 is enhanced by providing the frame means 12 with certain nonplanar bends and curvatures, such as in the shapes and configurations illustrated in FIGS. 1 and/or 1b and 1c. As best shown in FIG. 1, the outer shape of the frame means 12 includes curved corners and smoothly curved sides therebetween. The relatively smooth exterior shape provided by the preferred frame means 12 permits users to more effectively clean debris from curved surfaces of swimming pools. Prior art devices having straight sides and/or sharp corners are less effective in this regard, and can even puncture or otherwise damage pool liners if not used carefully.

Figure 1D:
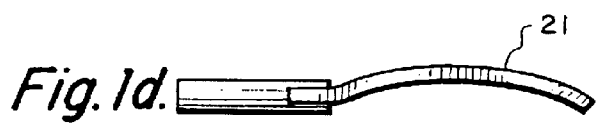
FIG. 1d is a side elevation view similar to FIG. 1c, but illustrating an alternative embodiment of the invention.

Other beneficial preferred curvatures include biasing outwardly and/or downwardly and/or upwardly the outermost edge 7 of the frame means 12. Examples of these curvatures are best illustrated in FIGS. 1 and 2 (outwardly), and 1c, 10 and 11 (downwardly). Other curvatures with similar benefits include biasing or providing the outer side edges 11, FIGS. 1b and 1c, upwardly. One of the similar alternative embodiments in this regard is illustrated as side edges 21, FIG. 1d.

In other words, the preferred frame means includes an elongated, curved frame portion operatively affixed to tubular attachment means 14, where the tubular attachment means has a central longitudinal axis (parallel to the line 3—3 in FIG. 2) and one or more of the outermost edge and side edges of the frame portion are not located in a flat plane. The flat plane relevant to the preferred embodiment is a plane that includes the longitudinal axis of the attachment means 14 and is tangent to the frame portion at its location of affixation to the attachment means 14.

As mentioned above, these curvatures can make it easier for a user to clean certain areas and/or surfaces of pools, especially curved areas and/or surfaces. In addition, curvatures such as those discussed in the preceding paragraph can improve the performance, flexibility of application, and/or durability of the device of my invention. Among other things, the "memory" of the material from which the preferred embodiment of the frame is fabricated is such to allow the frame to flex temporarily when sufficient force is exerted thereon during use. This flexure improves the conformance of the shape of the tool 10 to the pool surface being cleaned, and thereby improves the ease of use and effectiveness of the user's cleaning efforts. After release of such force, the preferred frame material and/or shape cause the frame to snap back to its original configuration.

By way of example, even though it preferably is provided in a curved configuration, the preferred frame means 12 is also useful for cleaning pool surfaces that are flat, in that the frame is preferably provided in a material and dimension that permits some deflection of the curved sides upon the application of pressure. Specifically by way of example, a user might place the front edge 7, FIG. 1, against the flat bottom of a pool and exert force against the bottom (such as along the longitudinal axis of the attachment tube means 14), temporarily flattening or bending the front edge 7 into a more nearly straight line. This temporary flattening and/or bending can occur in one or more planes simultaneously, such as deforming the edge 7 toward the attachment means 14, FIG. 1, and deforming it in a direction perpendicular with respect to a central longitudinal axis of the tubular attachment means 14 (upwardly as shown in FIG. 3).

Even where the particular pool surface to be cleaned is not flat but is also not the precise curvature of the undistorted frame means 12, a preferred technique or method such as the foregoing can be utilized with the preferred frame to cause the front edge 7 or other edge of the tool 10 to approximate or conform to the curvature of the pool surface.

Once the frame has been pressed into approximate conformance with the surface to be cleaned, the tool is preferably pushed across that surface. Debris which may be located upon that surface is urged into the tool means 10 for removal from the pool, as more thoroughly described below. If the curvature of the pool surfaces varies at different locations within the pool, the memory and flexibility of the frame means 12 preferably causes and permits those portions of the elongated frame member 16 that are in contact with the pool surface to conform to those variations as the tool 10 passes over them, thereby enhancing the cleaning on all surfaces of the pool.

As indicated above, the outer side edges (such as edges 11) of the frame means 12 may be provided so that they are smoothly bent out of planar alignment with the remainder of the frame member 16. The aforementioned preferred flexibility and memory of the frame member 16 has a similar use and benefit to that described above, enabling the tool 10 to be used for a wide variety of surfaces, whether curved, flat, or undulating.

As indicated above, after the user releases the pressure that has temporarily deformed the frame means 12, it preferably returns to its original shape (this is caused by the material memory, as indicated above). In this regard, prior art devices leave much to be desired. Those of which the applicant is aware are either so stiff that they can break when force is applied as described above, or do not have the requisite "memory" (this means that they tend to retain their deformed shape instead of returning to their "memorized" original shape upon release of the aforesaid force).

The particular materials and dimensions of the frame means 12 can be readily determined without undo experimentation for any particular size of tool 10, by persons of ordinary skill in the art. In addition to the preferred stainless steel material, the frame means 12 can be fabricated from aluminum, plastic, or similar lightweight, flexible, resilient material.

The effectiveness of debris collection is further preferably improved by the provision of the front edge 7 of the frame member 16 in an angled or twisted configuration, such as best illustrated in FIG. 3. Rather than providing the front edge in parallel alignment with the back edge, it is preferably twisted so that its leading edge 9 (as the tool 10 is pushed through the water during use) is relatively farther away from the attachment means 14 than is the trailing edge 5. As seen in FIGS. 1 and 1c, the attachment means 14 includes an elongated portion that coaxially extends along a longitudinal axis L. The frame means 12 consists of a frame member 16 extending continuously from the first end to the second end and bounding an opening O (FIG. 1) with a center C. The frame means includes a rear portion 11a including the first and second ends that extend generally parallel to a first plane that is coincident with the longitudinal axis. The frame includes a forward portion 11b having a generally rectangular cross section (see FIGS. 3 and 4). The forward portion includes a front edge 7 (see FIG. 1c and 3) constituting a major surface of the rectangular cross section of the frame member that faces outwardly away from the opening. The plane 1 of front edge 7 forms an acute exterior angle A with the first plane as viewed in a direction normal to a second plane coincident with the longitudinal axis L and perpendicular to the first plane when in the un-flexed position (see FIG. 1c) As described more thoroughly below, this enhances the contact between the leading edge of the tool 10 and the swimming pool surface with which it is in contact.

Thus, the preferred flexibility and configuration of the frame member 16 improve the ability of the tool 10 to intimately contact and clean the various (and potentially curved) surfaces of any particular swimming pool.

In the preferred embodiment, the mouth portion 6, FIG. 1, is covered by net means 40, such as a net member 42. The net member 42 is fabricated from any appropriate material, and is sized and configured to correspond with the opening 6 and to be able to retain a desired quantity of debris which may be collected in the net during use of the tool 10.

The net member 42 is preferably of conventional materials and construction and is preferably configured as a bag with an opening at one end. The net is assembled with the frame means 12 by laying the edge 44 of that opening over the frame means 12, preferably with the edge 44 being positioned on the relative outside of the frame means 12, FIG. 4. This positioning enhances the ease of removal of the debris from the net after collection thereof, because the debris does not get "hung up" on the lip or edge 44 of the net.

The net means 40 is preferably held or retained in operative relationship with the frame means 12 by retaining means 20 such as an elongated channel or strip 22, as best illustrated in FIG. 4. The strip 22 is preferably fabricated from plastic (such as polypropylene, polyethylene, butyrate, or the like) or other suitably tough, flexible, resilient, lightweight material having sufficient shape-memory to be snapped onto, and removed from, the frame means 12 as described herein. The channel or strip 22 is preferably in a generally U-shaped cross-section.

Although plastic U-shaped retaining channels or strips have been utilized in prior art devices, the present invention provides numerous advantages over any such prior art.

Among other things, the preferred embodiment of the retaining means 20 includes a first portion 24 extending from the frame means 12 when the retaining means 20 is operably assembled with the frame means 12. The first portion 24 includes a front surface 26 defined in part by a first or leading edge 28 which preferably contacts the surface of the pool which is to be cleaned. The first portion 24 also includes a second or trailing edge 30 positioned rearwardly with respect to the first edge 28 as the tool 10 is normally moved through the pool water. The front surface 26 is also defined in part by the second or trailing edge 30.

In the preferred embodiment, the second edge 30 is positioned inwardly from the first edge 28 with respect to the mouth 6 of the frame. The front surface 26 constitutes a smooth transition between the first and second edges 28 and 30, and the front surface 26 and the first and second edges are configured to scoop debris from the pool surface and direct it away from the first edge 28 and toward the second edge 30, and thereafter into the net means 40.

The retaining means 20 of my invention provides easier removal and assembly with respect to the frame means 12 and net means 40, than is possible with prior art devices. The preferred U-shaped cross-section includes a central web 31 and leg portions 32 and 34 extending therefrom in confronting contact with opposing surfaces of the frame means 12 (actually, in direct contact with the net means 40 between the frame means 12 and the leg portion 32 or 34). Each of the leg portions 32 and 34 preferably includes outer surfaces 36 and 38, and at least one of the leg portions 32 or 34 includes detent means 50 such as an engaging bead 52 for engaging the frame means 12 when the respective leg portions 32 and/or 34 are in their normal unflexed configuration assembled with the frame means 12 such as elongated frame member 16, FIG. 4.

The surfaces 36 and 38 are preferably tapered inwardly (as shown in FIG. 4), but could be tapered outwardly or be in any of a wide variety of other configurations.

The leg portion 32 and/or 34 having the detent means 50 also preferably includes gripping means 54 such as a tab extension 56, to permit a user to grip and manipulate the respective leg portion and its corresponding detent means 50 from the normally engaged relationship with respect to the frame means 12. This permits the user to readily engage and disengage the retaining means 20 with and from the frame means 12, and thereby replace the net, the retaining means or make other indicated repairs or corrections. In the preferred embodiment, the gripping means 54 such as grippable tab portion 56 extends outwardly from the frame means 12 beyond a plane defined by the respective outer surface 36 or 38 of the leg portion 32 or 34.

To facilitate the bending of the retaining means 20 about the curved periphery of the frame means 12 (and to permit the channel to be used on a wide variety of shapes of frame means 12, a plurality of slots or grooves or serrations 58 is preferably provided about one of the legs 32 or 34. These slots 58 are shown in FIGS. 2 and 3 as positioned on the interior of the frame mouth 6, but the slots could be utilized with efficacy by positioning them on the outside of the frame means 12. Alternative embodiments, not shown, would include (by way of example) those having no slots 58, slots at varying distances and/or angles along the length of the retaining means, etc.

Persons of ordinary skill in the art will understand that the invention could be practiced by utilizing a plurality of strips such as strip 22 in end-to-end, abutting relationship with each other about the length of the frame member 16 (instead of using a single elongated strip as shown.

Additionally, one of the many alternative embodiments of the invention (not shown) includes no detent means 50 on the leg portion with slots 58 (and no gripping means 54 on that leg portion either). This permits the channel 22 to be removed from the frame means 12 by gripping and moving only one of the leg portions instead of both. Moreover, having that one leg portion be the non-slotted leg portion avoids the need to unhook all of the slotted portions from the frame means.

Those of ordinary skill in the art will also understand that the aforementioned inventive retaining device may be utilized with prior art frame members, and that the frame means of my invention may be effectively utilized with prior art retaining devices.

Thus, the interior surfaces of the web 31 and the leg portions 32 and 34 are preferably configured to grippingly engage and retain the net means 40 on the frame means 12 when the retaining means 20 is operatively assembled about them. The exterior surface 26 of the web 31 is configured and positioned to form a smoothly sloping surface whereby, as the assembled net, frame and retaining device 20 is moved through a swimming pool, the targeted debris is urged into the net means 40.

Some of the many alternative embodiments of my invention are illustrated in FIGS. 5–7. Frame means 70, FIG. 5, is preferably formed or cast as a single unit (even from nylon or similar material) incorporating both an attachment section 72 and a rim portion 74 forming the mouth of the frame. The preferred dimensions and materials (especially those of neck portion 76) are such as to more effectively distribute the stresses that are exerted on the frame during use of the invention. FIG. 7 also illustrates an embodiment of shorter serrations or slots on one leg portion of the retaining means than shown in FIG. 6. The length of the serrations should be sufficient to permit the portions defined thereby to be readily flexed to permit engagement and disengagement with the frame means, but not so long as to make them incapable of exerting a desirable amount of gripping force on the frame means while engaged.

Other than the neck portion 76 related to the unitary nature of the frame means 70, the comments set forth above concerning the preferred embodiment of my invention apply to the alternative embodiment of FIGS. 5–7. For example, the net means 80 is similar to net means 40 of FIGS. 14, and the retaining means 82 is similar to retaining means 20 of FIGS. 1–4.

Figure 14:
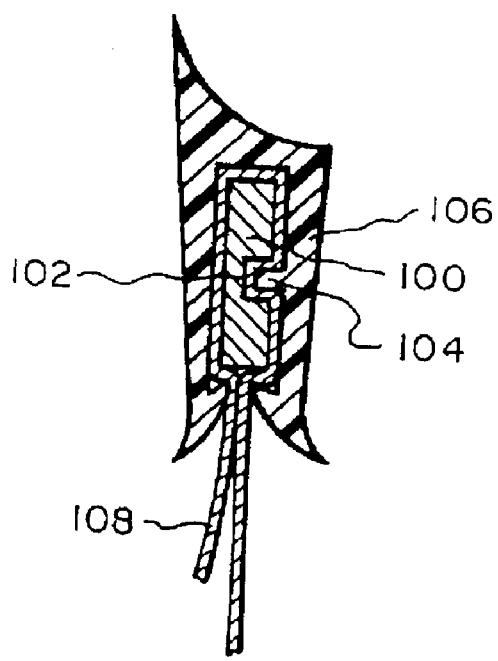
FIG. 14 is similar to FIG. 4, but illustrates one of the many alternative embodiments of the invention.

In FIG. 8, I illustrate cross-sections of some of the many alternative embodiments of retaining means such as retaining means 20 and 82. Among other things, these show alternative configurations of the smooth transition surface such as surface 26 to urge debris into the net means, and of the detent means and gripping means of my invention. In addition, the gripping action of the retaining means on the frame/net assembly can be enhanced by providing a groove or cavity in the frame means and a correspondingly sized and positioned protruding portion such as portion 84, FIG. 8. FIG. 14 illustrates one of the many assemblies and shapes of a groove or cavity 102 in a frame means 100; a correspondingly sized, shaped, and positioned protruding portion 104 (similar to portion 84 of FIG. 8) on a retaining member 106; and net means 108.

As indicated above, the gripping means of my invention provide an advance (among other advances) over the prior art known to me, with respect to assisting the user to engage and/or disengage the retaining means from the frame. The preferred gripping means makes it much easier to assemble and repair the tool 10 than was possible with prior art constructions.

Figure 9:
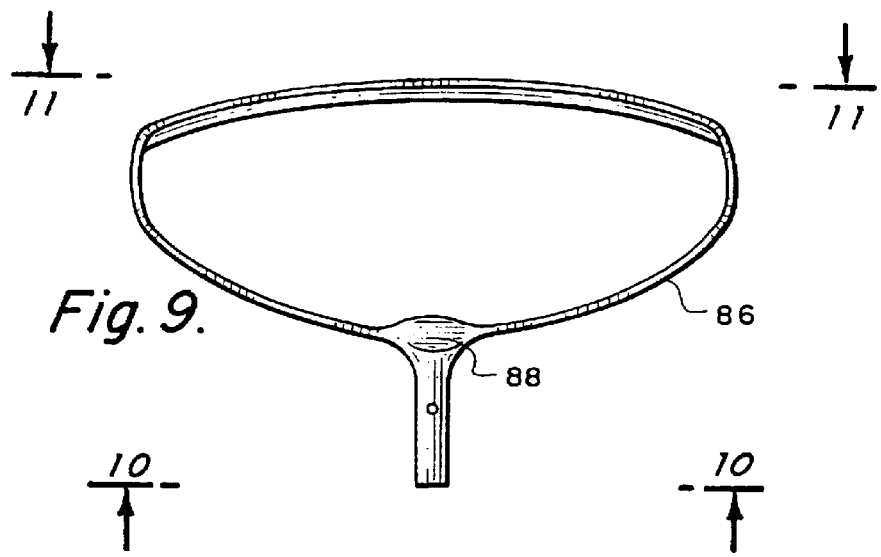
FIG. 9 is similar to FIG. 5, but illustrates another of the many alternative embodiments of the frame means of the invention.
Figure 10:
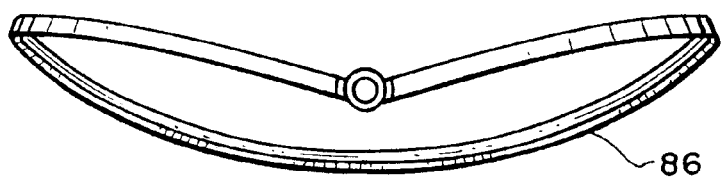
FIG. 10 is an end elevation view taken along line 10—10 of FIG. 1.
Figure 11:
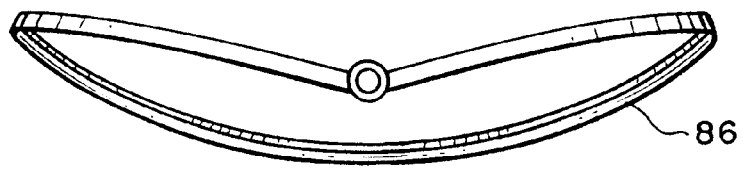
FIG. 11 is an end elevation view taken along line 11—11 of FIG. 9.
Figure 12:
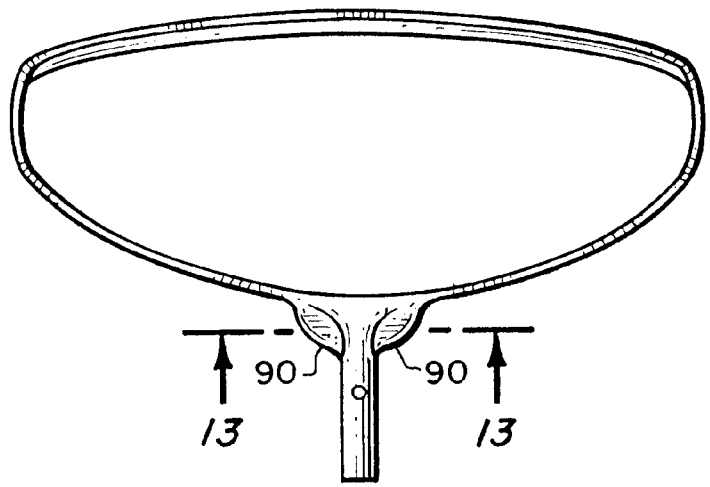
FIG. 12 is similar to FIG. 5, but illustrates yet another of the many alternative embodiments of the frame means of the invention.
Figure 13:
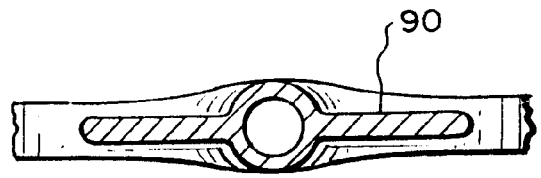
FIG. 13 is a sectional view taken along line 13—13 of FIG. 12.

Yet another of the many alternative embodiments of the frame means of my invention is illustrated as frame member 86, FIG. 9, which includes supporting web 88 for additional durability and strength. This and others of the illustrated and non-illustrated embodiments of my invention can include curvatures such as those illustrated in FIGS. 10 and 11, with beneficial functionality similar to that described above. Still another alternative embodiment, FIGS. 12 and 13, includes one or more supplemental side webs 90 for added strength and durability of the tool. These webs are shown as symmetrical, but alternative embodiments could include a wide range of shapes and sizes of webs and non-symmetrical arrangements. Embodiments such as FIGS. 9, 12 and 13 may be fabricated from plastic or other suitably strong, durable, flexible, resilient material.

Thus, by my invention, I provide an improved method and apparatus for cleaning swimming pools, including the use of a durable, flexible, smoothly-contoured frame member and means for retaining a net on the frame which is readily engageable and removable and shaped to urge debris into the net.

The tool and method of my invention have been described with some particularity but the specific designs, constructions and steps disclosed are not to be taken as delimiting of the invention in that various modifications will at once make themselves apparent to those of ordinary skill in the art, all of which will not depart from the essence of the invention and all such changes and modifications are intended to be encompassed within the appended claims.

I claim:

1. The combination of handle means and a tool for cleaning debris from swimming pools, said tool including frame means having a central opening covered by a net; retaining means for retaining said net on said frame means; and attachment means configured to permit attachment of said tool to handle means, in which said frame means and said attachment means are fabricated from metal and said frame means has first and second ends welded to said attachment means, in which said attachment means coaxially extends along a longitudinal axis, said frame means having a rear portion including said first and second ends, wherein said rear portion extends generally parallel to a first plane that is coincident with said longitudinal axis, said frame including a forward portion having a generally rectangular cross section wherein said forward portion includes a front edge constituting a major surface of said rectangular cross section of said frame member that faces outwardly away from said opening, a second plane coincident with said longitudinal axis and perpendicular to said first plane, wherein a plane coincident with said front edge forms an acute exterior angle with said first plane as viewed in a direction normal to said second plane when in an un-flexed position.

2. The tool of claim 1, in which said attachment means is in a tubular configuration having an interior and an exterior.

3. The tool of claim 1, further including at least one supplemental brace member affixed to said frame means and said attachment means.

4. The tool of claim 1, in which said ends confront said attachment means along a predetermined length.

5. The tool of claim 4, in which said ends are welded to said attachment means along substantially all of said confronting length.

6. The tool of claim 4, in which at least one of said ends is welded to said attachment means at least one point along said confronting length.

7. The combination of claim 1 in which said retaining means includes an elongated, flexible, resilient member configured in a substantially U-shaped cross-section.

8. The combination of claim 7 in which said elongated, flexible, resilient member includes detent means for engaging said frame means and further includes gripping means on at least one leg of said U-shaped cross-section, to assist a user to manipulate said detent means.

9. The combination of claim 7 in which said elongated, flexible, resilient member includes a scraping surface extending between first and second edges, said scraping surface facing away from extending legs that form said U-shaped cross-section.

10. The combination of claim 7 further including interfitting configurations on said frame means and on at least one leg of said U-shaped cross-section to prevent slippage of said net means from said tool.

11. The combination of claim 10, in which said interfitting configurations include a cavity on said frame means and a corresponding detent member on said at least one leg of said U-shaped cross-section.

12. The combination of handle means and a tool for cleaning debris from swimming pools, said tool including frame means having a central opening covered by a removable net; a retaining device for temporarily retaining said net on said frame means, said retaining device configured to confront and substantially enwrap both an interior surface and an exterior surface of said frame means; and attachment means configured to permit attachment of said tool to handle means, in which said frame means includes first and second ends, means for permanently affixing said first and second ends to said attachment means, in which said attachment means coaxially extends along a longitudinal axis, said frame means having a rear portion including said first and second ends, wherein said rear portion extends generally parallel to a first plane that is coincident with said longitudinal axis, said frame including a forward portion having a generally rectangular cross section wherein said forward portion includes a front edge constituting a major surface of said rectangular cross section of said frame member that faces outwardly away from said opening, a second plane coincident with said longitudinal axis and perpendicular to said first plane, wherein a plane coincident with said front edge forms an acute exterior angle with said first plane as viewed in a direction normal to said second plane when in an un-flexed position.

13. The combination of claim 1 or claim 7 whereby the front edge of said frame can be flexed inwardly into said opening upon force exerted thereto by a user via said attachment means so as to conform to a surface of said pool to be cleaned.

14. The combination of claim 12 in which said frame means and said attachment means are formed from plastic.

15. The combination of claim 12 in which said retaining device includes an elongated, flexible, resilient member configured in a substantially U-shaped cross-section.

16. The combination of claim 15 in which said elongated, flexible, resilient member includes detent means for engaging said frame means and further includes gripping means on at least one leg of said U-shaped cross-section, to assist a user to manipulate said detent means.

17. The combination of claim 15 in which said elongated, flexible, resilient member includes a scraping surface extending between first and second edges, said scraping surface facing away from extending legs that form said U-shaped cross-section.

18. The combination of claim 15 further including interfitting configurations on said frame means and on at least one leg of said U-shaped cross-section to prevent slippage of said net means from said tool.

19. The combination of claim 18, in which said interfitting configurations include a groove on said frame means and a corresponding detent member on said at least one leg of said U-shaped cross-section.

20. A tool for cleaning debris from swimming pools, said tool including frame means having a central opening covered by a removable net; a retaining device for temporarily retaining said net on said frame means, said retaining device configured to confront and substantially enwrap both an interior surface and an exterior surface of said frame means, and attachment means configured to permit attachment of said tool to a handle, in which said frame means includes first and second ends, means for permanently affixing said first and second ends to said attachment means, in which said attachment means coaxially extends along a longitudinal axis, said frame means having a rear portion including said first and second ends, wherein said rear portion extends generally parallel to a first plane that is coincident with said longitudinal axis, said frame including a forward portion having a generally rectangular cross section wherein said forward portion includes a front edge constituting a major surface of said rectangular cross section of said frame member that faces outwardly away from said opening, a second plane coincident with said longitudinal axis and perpendicular to said first plane, wherein a plane coincident with said front edge forms an acute exterior angle with said first plane as viewed in a direction normal to said second plane when in an un-flexed position.

21. The tool of claim 9, in which said forward portion of said frame means generally defines a curvilinear plane.

22. A tool for cleaning debris from swimming pools, said tool including frame means having a central opening covered by a removable net; a retaining device for temporarily retaining said net on said frame means, said retaining device configured to confront and substantially enwrap both an interior surface and an exterior surface of said frame means; and attachment means configured to permit attachment of said tool to a handle, in which said frame means includes first and second ends, means for permanently affixing said first and second ends to said attachment means, in which said attachment means includes an elongated portion that coaxially extends along a longitudinal axis, said frame means having a rear portion including said first and second ends, wherein said rear portion extends generally parallel to a first plane that is coincident with said longitudinal axis, said frame including a forward portion having a generally rectangular cross section wherein said forward portion includes a front edge constituting a major surface of said rectangular cross section of said frame member that faces outwardly away from said opening, a second plane coincident with said longitudinal axis and perpendicular to said first plane, wherein a plane coincident with said front edge forms an acute exterior angle with said first plane as viewed in a direction normal to said second plane when in said un-flexed position.

23. The tool of claim 9 or claim 11 whereby the front edge of said frame can be flexed inwardly into said opening upon force exerted thereto by a user via said attachment means so as to conform to a surface of said pool to be cleaned.

24. The tool of claim 20 or claim 22 in which said frame means and said attachment means are formed from plastic.

25. The tool of claim 24 in which said retaining device includes an elongated, flexible, resilient member configured in a substantially U-shaped cross-section.

26. The tool of claim 25 in which said elongated, flexible, resilient member includes detent means for engaging said frame means and further includes gripping means on at least one leg of said U-shaped cross-section, to assist a user to manipulate said detent means.

27. The tool of claim 25 in which said elongated, flexible, resilient member includes a scraping surface extending between first and second edges, said scraping surface facing away from extending legs that form said U-shaped cross-section.

28. The tool of claim 25 further including interfitting configurations on said frame means and on at least one leg of said U-shaped cross-section to prevent slippage of said net means from said tool.

29. The tool of claim 28 in which said interfitting configurations include a cavity on said frame means and a corresponding detent member on said at least one leg of said U-shaped cross-section.

30. The tool of claim 20 or 22 in which said retaining device includes an elongated, flexible, resilient member configured in a substantially U-shaped cross-section.

31. The tool of claim 30 in which said elongated, flexible, resilient member includes detent means for engaging said frame means and further includes gripping means on at least one leg of said U-shaped cross-section, to assist a user to manipulate said detent means.

32. The tool of claim 30 in which said elongated, flexible, resilient member includes a scraping surface extending between first and second edges, said scraping surface facing away from extending legs that form said U-shaped cross-section.

33. The tool of claim 30 further including interfitting configurations on said frame means and on at least one leg of said U-shaped cross-section to prevent slippage of said net means from said tool.

34. The tool of claim 33, in which said interfitting configurations include a groove on said frame means and a corresponding detent member on said at least one leg of said U-shaped cross-section.

35. The combination of handle means and a tool for cleaning debris from swimming pools, said tool including frame means having a central opening covered by a net; retaining means for retaining said net on said frame means; and attachment means configured to permit attachment of said tool to handle means, in which said frame means has first and second ends integrally formed with said attachment means, in which said attachment means coaxially extends along a longitudinal axis, said frame means having a rear portion including said first and second ends, wherein said rear portion extends generally parallel to a first plane that is coincident with said longitudinal axis, said frame including a forward portion having a generally rectangular cross section wherein said forward portion includes a front edge constituting a major surface of said rectangular cross section of said frame member that faces outwardly away from said opening, a second plane coincident with said longitudinal axis and perpendicular to said first plane, wherein a plane coincident with said front edge forms an acute exterior angle with said first plane as viewed in a direction normal to said second plane when in an un-flexed position.

36. The combination of handle means and a tool for cleaning debris from swimming pools, said tool including frame means having a central opening covered by a removable net; a retaining device for temporarily retaining said net on said frame means, said retaining device configured to confront and substantially enwrap both an interior surface and an exterior surface of said frame means; and attachment means configured to permit attachment of said tool to handle means, in which said frame means includes first and second ends, means for affixing said first and second ends to said attachment means, in which said attachment means coaxially extends along a longitudinal axis, said frame means having a rear portion including said first and second ends, wherein said rear portion extends generally parallel to a first plane that is coincident with said longitudinal axis, said frame including a forward portion having a generally rectangular cross section wherein said forward portion includes a front edge constituting a major surface of said rectangular cross section of said frame member that faces outwardly away from said opening, a second plane coincident with said longitudinal axis and perpendicular to said first plane, wherein a plane coincident with said front edge forms an acute exterior angle with said first plane as viewed in a direction normal to said second plane when in an un-flexed position.

37. A tool for cleaning debris from swimming pools, said tool including frame means having a central opening covered by a removable net; a retaining device for temporarily retaining said net on said frame means, said retaining device configured to confront and substantially enwrap both an interior surface and an exterior surface of said frame means, and attachment means configured to permit attachment of said tool to a handle, in which said frame means includes first and second ends, means for affixing said first and second ends to said attachment means, in which said attachment means coaxially extends along a longitudinal axis, said frame means having a rear portion including said first and second ends, wherein said rear portion extends generally parallel to a first plane that is coincident with said longitudinal axis, said frame including a forward portion having a generally rectangular cross section wherein said forward portion includes a front edge constituting a major surface of said rectangular cross section of said frame member that faces outwardly away from said opening, a second plane coincident with said longitudinal axis and perpendicular to said first plane, wherein a plane coincident with said front edge forms an acute exterior angle with said first plane as viewed in a direction normal to said second plane when in an un-flexed position.

38. A tool for cleaning debris from swimming pools, said tool including frame means having a central opening covered by a removable net; a retaining device for temporarily retaining said net on said frame means, said retaining device configured to confront and substantially enwrap both an interior surface and an exterior surface of said frame means; and attachment means configured to permit attachment of said tool to a handle, in which said frame means includes first and second ends, means for affixing said first and second ends to said attachment means, in which said attachment means includes an elongated portion that coaxially extends along a longitudinal axis, said frame means having a rear portion including said first and second ends, wherein said rear portion extends generally parallel to a first plane that is coincident with said longitudinal axis, said frame including a forward portion having a generally rectangular cross section wherein said forward portion includes a front edge constituting a major surface of said rectangular cross section of said frame member that faces outwardly away from said opening, a second plane coincident with said longitudinal axis and perpendicular to said first plane, wherein a plane coincident with said front edge forms an acute exterior angle with said first plane as viewed in a direction normal to said second plane when in an un-flexed position.

* * * * *

UNITED STATES PATENT AND TRADEMARK OFFICE
CERTIFICATE OF CORRECTION

PATENT NO. : 6,368,502 B1
DATED : April 9, 2002
INVENTOR(S) : Eric Resh

It is certified that error appears in the above-identified patent and that said Letters Patent is hereby corrected as shown below:

Column 11,
Line 54, "when in said" should read -- when in an --.

Signed and Sealed this

Eighth Day of October, 2002

Attest:

Attesting Officer

JAMES E. ROGAN
Director of the United States Patent and Trademark Office